United States Patent [19]

Watanabe et al.

[11] Patent Number: 5,576,087

[45] Date of Patent: Nov. 19, 1996

[54] MAGNETO-OPTICAL RECORDING MEDIUM

[75] Inventors: Yukio Watanabe; Shinichi Tachibana, both of Machida, Japan

[73] Assignee: Canon Kabushiki Kaisha, Tokyo, Japan

[21] Appl. No.: 119,652

[22] Filed: Sep. 13, 1993

[30] Foreign Application Priority Data

Sep. 18, 1992 [JP] Japan .................................. 4-249772

[51] Int. Cl.⁶ ................................ G11B 5/66; B32B 3/10
[52] U.S. Cl. .................... 428/141; 428/694 DE; 428/694 RL; 428/694 TR; 428/694 SG; 428/694 RE; 428/900; 428/694 AH
[58] Field of Search ................ 428/694 DE, 694 RL, 428/694 AH, 694 TR, 694 SG, 141, 900, 694 RE

[56] References Cited

U.S. PATENT DOCUMENTS

| | | | |
|---|---|---|---|
| 4,923,766 | 5/1990 | Hosoi et al. | 428/694 BU |
| 5,073,439 | 12/1991 | Hashimoto et al. | 428/328 |
| 5,102,709 | 4/1992 | Tachibana et al. | 428/65.1 |
| 5,110,680 | 5/1992 | Yamamoto et al. | 428/413 |
| 5,169,703 | 12/1992 | Miyazaki et al. | 428/141 |

FOREIGN PATENT DOCUMENTS

| | | |
|---|---|---|
| 0484945 | 5/1992 | European Pat. Off. . |
| 51-107121 | 9/1976 | Japan . |
| 21421 | 3/1990 | Japan . |
| 4064936 | 2/1991 | Japan . |
| 3066079 | 3/1991 | Japan . |
| 209628 | 12/1991 | Japan . |
| 4184730 | 7/1992 | Japan . |
| 4195746 | 7/1992 | Japan . |
| 4195748 | 7/1992 | Japan . |

OTHER PUBLICATIONS

European Search Report.

*Primary Examiner*—Leszek Kiliman
*Attorney, Agent, or Firm*—Fitzpatrick, Cella, Harper & Scinto

[57] ABSTRACT

A magneto-optical recording medium that exhibits an excellent ability to achieve flying stability for the associated magnetic head during recording operations and can effectively prevent adsorption of the magnetic head on its protective layer, includes a substrate, a recording layer with a magneto-optical recording film, and a protective layer, which are arranged in this order, wherein that surface of the protective layer which is not opposed to the recording layer has a surface roughness of not less than 0.1 μm but not more than 0.85 μm as measured in terms of center line average height.

6 Claims, 8 Drawing Sheets

MAGNETO-OPTICAL RECORDING MEDIUM

BACKGROUND OF THE INVENTION

1. Field of the Invention

The present invention relates to a magneto-optical recording medium on which information is recorded by using a laser beam and a magnetic head.

2. Description of the Related Art

In recent years, magneto-optical recording media have been attracting attention as a type of optical recording medium that allows erasing and re-writing of information.

In conventional magneto-optical recording media, a so-called light modulation system is used in which a magnetic recording layer is locally heated by applying a laser beam thereto, while a magnetic field is also applied, whereby the coercive force of the recording layer is reduced, thereby effecting changes in the orientation of magnetization in the layer, so as to effect the recording of information thereon. In such a system, however, the overwriting of information is impossible, which is an obstacle to the re-writing of information.

To solve this problem, a so-called magnetic-field modulation system has been proposed in, for example, Japanese Patent Laid-Open No. 51-107121, according to which the magnetic field applied to the magnetic recording layer is modulated by an information signal, thereby changing the orientation of magnetization in the recording layer so as to effect the recording of information.

FIG. 9 of the drawings accompanying this specification shows the construction of a conventional magneto-optical recording system. The recording medium generally consists of a substrate 1, a recording layer 6 formed on the substrate 1 and having a magneto-optical recording film (not separately indicated), and a protective layer 7 formed on the recording layer 6. A light source (not shown) is arranged in such a way that a laser beam 92 can be applied to the recording layer 6 through the substrate 1. Further, a magnetic-field generating means 91 (e.g., a flying-type magnetic head) is provided to that side of the recording medium on which the protective layer 7 is arranged.

In a magneto-optical recording medium, and, in particular, in a magneto-optical recording system of the magnetic-field modulation type as described above, the gap between the protective layer of the magneto-optical recording medium and the magnetic head during recording (which gap is indicated at "h" in the example shown in FIG. 9) is set very small (e.g., approximately 5 μm). Thus, to prevent the magnetic head from coming into contact with the protective layer, it is necessary to minimize the surface irregularities of the protective layer. On the other hand, if the surface is too smooth, adsorption may occur between the flying-type magnetic head and the protective layer when they come into contact with each other, resulting in a phenomenon called "head crash". In view of this, a method has been proposed according to which a filler material is mixed in with the matrix material of which the protective layer is made so as to make the surface of the protective layer appropriately rough, thereby preventing such adsorption. For example, Japanese Patent Laid-Open No. 4-64936 discloses a method according to which the problem is solved by adjusting the surface roughness of the protective layer to a level ranging from 0.01 to 0.05 μm. This surface roughness is generally measured in terms of Ra (center line average roughness), which indicates correlativity between the flying stability of the flying-type magnetic head and the probability of adsorption at normal temperature and humidity. However, under a relatively high-temperature/humidity condition, for example, 50° C. and 80%RH, a roughness range of 0.01 to 0.05 μm does not assure flying stability for the head and prevention of adsorption between the head and the protective layer. Thus, even when Ra is within that range, it may be impossible to completely avoid such adsorption under high-temperature/humidity condition.

SUMMARY OF THE INVENTION

The present invention has been made in view of the above problem in the prior art. It is accordingly an object of this invention to provide a magneto-optical recording medium which advantageously helps to attain magnetic-head flying stability even under high-temperature/humidity conditions and which can effectively prevent adsorption between the head and the protective layer.

To achieve the above object, the present inventors made a careful study and found that the flying stability of the flying-type magnetic head and the probability of adsorption are clearly related to the center line average height (hereinafter abbreviated as "Rpm") as a standard for the surface roughness of the protective layer. In accordance with the present invention, there is provided a magneto-optical recording medium of the type that includes a substrate, a recording layer having a magneto-optical recording film provided on the substrate, and a protective layer provided on the recording film, wherein that surface of the protective layer which does not face the recording layer has a roughness of not less than 0.1 μm but not more than 0.85 μm, as measured in terms of center line average height.

Further, in accordance with the present invention, there is provided a magneto-optical recording medium of the type which includes a substrate and a recording layer having a magneto-optical recording film, wherein that surface of the magneto-optical recording medium which faces the magnetic-field generating means has a surface roughness of not less than 0.1 μm but not more than 0.85 μm, as measured in terms of center line average height.

In a similar aspect, the present invention relates to a magneto-optical recording medium of the type which includes a substrate and a recording layer having a magneto-optical recording film, wherein a surface of the magneto-optical recording medium which, during operation, is opposed to a magnetic-field generating means has a surface roughness in the range of 0.1 μm to 0.85 μm, as measured in terms of center line average height.

DETAILED DESCRIPTION OF THE PREFERRED EMBODIMENTS

Embodiments of the present invention will now be described in detail with reference to the drawings.

Figure 1:
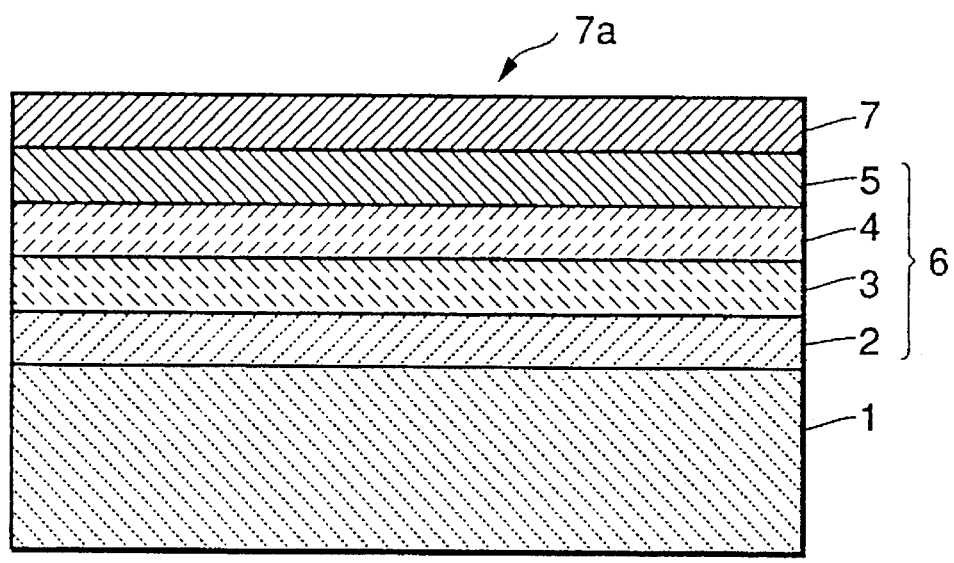
FIG. 1 is a schematic sectional view of a magneto-optical recording disk according to an embodiment of the present invention.

FIG. 1 is a schematic sectional view of the layer construction of a magneto-optical recording medium according to an embodiment of the present invention. In the drawing, numeral 1 indicates a substrate having on its surface a preformat (not shown) consisting of guide grooves, pre-pits, etc.; numeral 2 indicates a thin film of an inorganic dielectric substance; numeral 3 indicates an amorphous magnetic recording film; numeral 4 indicates a thin film of an inorganic dielectric substance; and numeral 5 indicates a reflecting film (i.e., a film that reflects laser beams). The films 2 through 5 constitute a recording layer 6. Numeral 7 indicates a protective layer formed on the reflecting film 5 of the recording layer 6. In the present invention, the surface 7a of the protective layer 7, which does not face the recording layer 6 (in other words, that surface of the magneto-optical recording medium which, in use, is directly opposite to the magnetic-field generating means) has a surface roughness of not less than 0.1 µm but not more than 0.85 µm, as measured in terms of Rpm. By adjusting the Rpm of the surface of the protective layer to a level within this range, it is possible to obtain a magneto-optical recording medium having an excellent ability to achieve flying stability for the associated magnetic head, effectively preventing the magnetic head from being adsorbed on the protective layer.

Figure 2:
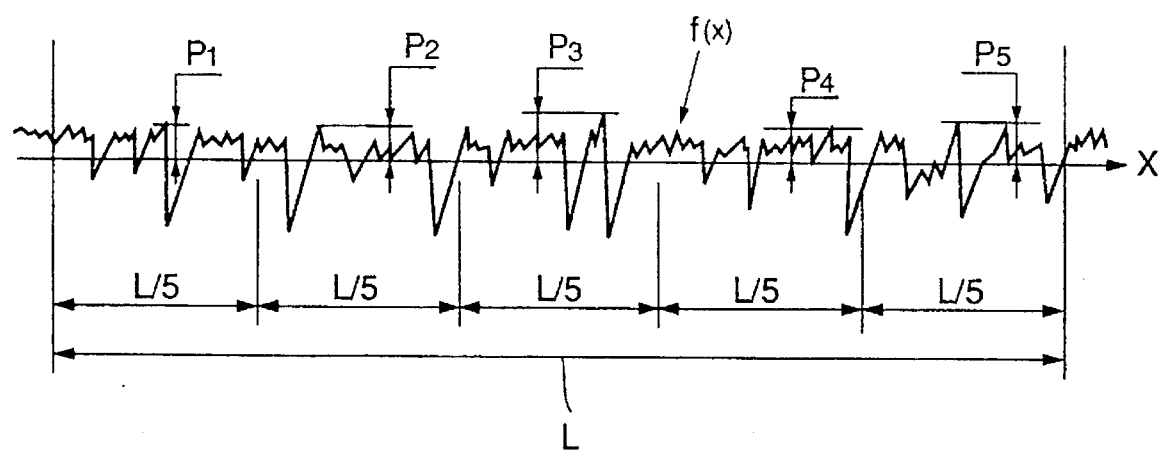
FIG. 2 is a diagram illustrating the concept of center line average height (Rpm)

FIG. 2 illustrates how the value of Rpm is obtained in the present invention. In the drawing, f(x) indicates a roughness curve representing the surface roughness of the protective layer. FIG. 2 shows a portion of this roughness curve f(x), which is sampled along a center line (X) over a traversing length L, and this sampled portion of the roughness curve f(x) is divided into five equal parts. In each part, the distance between the Center line (X) and a straight line which is parallel to the center line (X) and which passes the highest crest in that part of the f(x) curve is represented as $P_n$ (n=1, 2, 3, 4, or 5). In the present invention, Rpm is a value which can be expressed by the following equation:

$$(R_{pm}) = (1/5)(P_1 + P_2 + P_3 + P_4 + P_5)$$

Here, the "center line (X)" of the roughness curve f(x) means a straight line which is parallel to an average line of the roughness curve f(x) and which defines enclosed regions together with the roughness curve f(x) in such a way that the sum of the areas of those enclosed regions defined on one side of this straight line is the same as the sum of the areas of those regions defined on the other side thereof. The "average line" of the roughness curve f(x) means a straight line which is parallel to that portion of the surface of the protective layer that corresponds to the sampled portion of the roughness curve f(x) and that is set in such a way that the sum of the squares of deviations between that line and the roughness curve f(x) is minimum.

In the present invention, the length L used in the calculation of Rpm is preferably in the range of 2 to 6 mm to get a reliable reading.

Further, in the present invention, it is desirable from the standpoint of achieving flying stability for the magnetic head to restrict the value of Rpm to the range of not less than 0.1 µm but not more than 0.8 µm and, in particular, to the range of not less than 0.15 µm but not more than 0.75 µm. By establishing an Rpm within the latter range, the coefficient of friction between the magnetic head and the protective layer is kept a sufficiently low that recording quality can be good, even when the linear velocity of the magnetic head with respect to the protective layer is relatively low.

Setting the lower limit of the value of Rpm at 0.4 µm, or, in particular, 0.5 µm, is especially desirable, since it helps prevent adsorption of the magnetic head on the surface of the protective layer even under very severe conditions, for instance when ambient humidity is so high as to cause dew to form.

Next, some examples of methods of producing the magneto-optical recording medium of the present invention will be described.

In one method, a solution is prepared by dispersing a filler material consisting of ceramic particles of $Al_2O_3$, $SiO_2$, TiO, $TiO_2$, ZnO or the like, or metal particles of Cu, Ni, Al or the like, in a matrix of an ultraviolet-radiation-curable resin composition. This solution is applied to a recording layer formed on a substrate by any suitable method, such as evaporation or sputtering. Then the solution is allowed to cure by being exposed to ultraviolet radiation. In this method, the Rpm of the surface of the protective layer can be easily controlled so as to keep it within the range of 0.1 µm to 0.85 µm by appropriately selecting the grain size of the filler material, the viscosity of the ultraviolet-curable resin composition, and the method of application.

In another method, a film or sheet formed beforehand in such a way that its surface roughness in terms of Rpm is 0.1 to 0.85 µm is adhered to the recording layer, for example, by use of an adhesive, tackifier or the like.

In still another method, a photo-curable resin composition is applied to the recording layer to form a photo-curable resin composition layer, and a master plate having a pattern whose Rpm ranges from 0.1 to 0.85 µm is pressed against the photo-curable resin composition layer, and then light is applied to the photo-curable resin layer while pressing the master against the photo-curable resin composition layer, thereby transferring the pattern to this cured photo-curable resin composition layer.

In the present invention, it is desirable to disperse in the resinous matrix of which the protective layer is formed, metal particles or ceramic particles coated with an electrically conductive material (Ni, Cu, Au, Ag, Sb or the like) in such an amount as to provide a resistivity for the surface 7a of the protective layer 7 at a level not higher than $1 \times 10^{10}$ Ω/sq. This arrangement helps to effectively restrain electrostatic adsorption between the magnetic head and the protective layer in a low-humidity environment.

In the present invention, it is desirable for the thickness of the protective layer to be in the range from 2 to 30 µm and, in particular, from 5 to 10 µm. When the thickness is within this range, it is possible to apply a sufficient magnetic field to the recording layer to effect a recording, while maintaining the protecting function of the protective layer with respect to damage from the outside.

Figure 9:
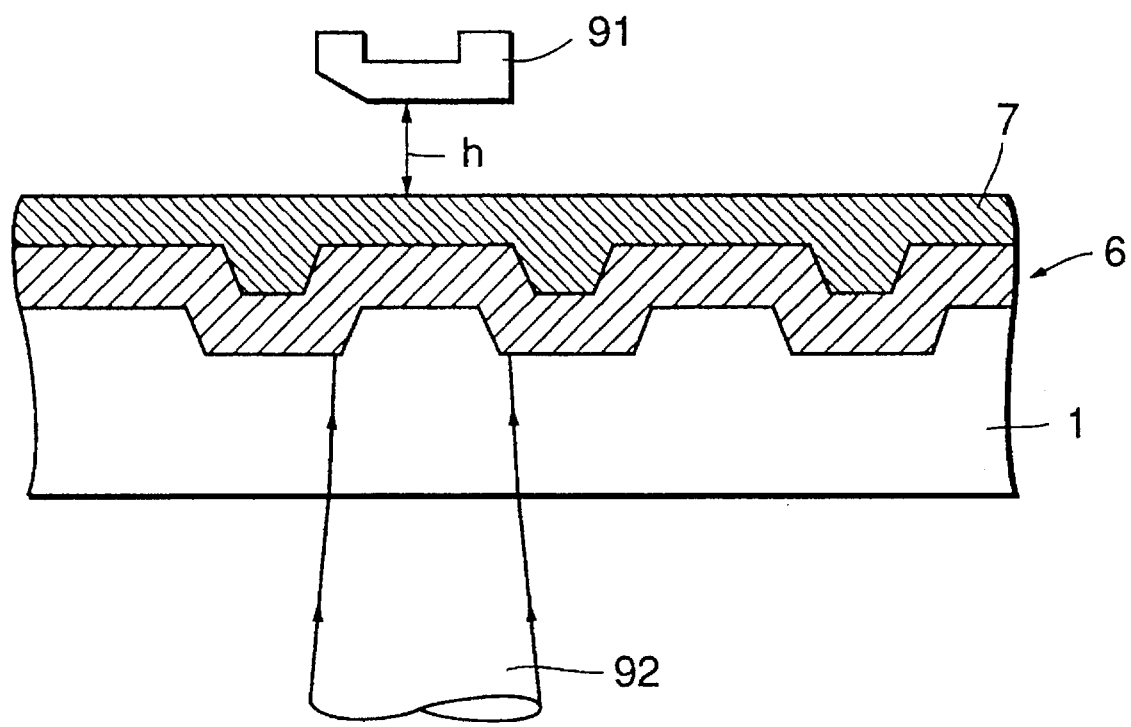
FIG. 9 is a schematic diagram showing the positional relationship between the magnetic head, the laser beam and the magneto-optical disk when information is being recorded on the disk.

In the magneto-optical recording medium of the present invention as described above, the Rpm of the surface 7a of the protective layer 7 was set at 0.1 to 0.85 μm. However, in the case of a magneto-optical recording medium which is used, for example, in a system in which the arrangement of the magnetic head and the laser beam is the reverse of that of FIG. 9 (i.e., when the magnetic head is arranged on the substrate side), it is desirable to adopt a construction in which that surface of the magneto-optical recording medium which is opposed to the magnetic head, i.e., that surface of the substrate on which the recording layer is not formed, has a surface roughness in terms of Rpm ranging from 0.1 to 0.85 μm. Alternatively, if in the latter embodiment the surface of the substrate on which the recording layer is not formed is laminated to a protective layer, then the surface of that protective layer that is opposed to the magnetic head should have a surface roughness in terms of Rpm ranging from 0.1 to 0.85 μm. Such surfaces can be formed in the same way as described above.

There is no restriction regarding the construction of the recording layer or the materials used in the magneto-optical recording medium to which the present invention is applicable.

Regarding the construction of the recording layer, it is also possible to adopt, for example, a construction in which an inorganic dielectric protective film is provided on one side of a magnetic recording film, or a construction in which no reflecting layer is provided.

Examples of the magneto-optical recording film include amorphous recording layers containing a material selected from the group consisting of rare earth elements and transition metals. Preferably, the recording layer will contain at least one rare earth element or transition metal —e.g., mixtures, such as GdFe, TbFe, GdTbFe, TbFeCo, GdTbFeCo, etc. Examples of suitable materials for the inorganic dielectric protective film include $Si_3N_4$, $SiO_2$, ZnS, SiC, etc. Examples of suitable materials for the reflecting layer include aluminum, gold, silver, etc.

In the present invention, there is no particular restriction regarding the substrate. For example, it is possible to employ a substrate which has a pre-format such as guide grooves and pre-pits on its surface and which is made of polycarbonate resin, acrylic resin, polystyrene resin, polyolefin resin or the like. It is also possible to employ a substrate on which a pre-format is formed by the 2P-method. It is desirable that the thickness of the substrate be, for example, from 0.3 to 5 mm and, in particular, from 0.8 to 1.5 mm, in order that any dust adhering to the substrate surface will not interfere with the laser beam, which is applied to the recording layer through the substrate.

As described above, by controlling the surface roughness of the protective layer so that it will be not less than 0.1 μm but not more than 0.85 μm, as measured in terms of Rpm (center line average height), it is possible to maintain the flying stability of the flying-type magnetic head even in a high-temperature/humidity condition and to restrain adsorption between the protective layer and the flying-type magnetic head. Therefore, by measuring Rpm, it is possible to obtain a high-performance magneto-optical recording medium for flying-type magnetic heads which excels in its ability to realize flying stability for the associated magnetic head even in a high-temperature/humidity condition and which restrains the generation of adsorption. Further, measurement of Rpm enables such a magneto-optical recording medium to be easily obtained, there being no need to examine flying stability, adsorption characteristic, etc. by using a flying-type magnetic head.

EXAMPLES

The present invention will now be described in more detail with reference to some embodiments thereof.

(Example 1)

A magneto-optical disk was prepared in the following manner: a film of $Si_3N_4$ having a thickness of 1000Å, a film of TbFeCo having a thickness of 100Å, a film of $Si_3N_4$ having a thickness of 300Å, and a film of Al having a thickness of 600Å were successively formed in this order by sputtering on a transparent, doughnut-shaped polycarbonate substrate having an outer diameter of 86 mm, an inner diameter of 15 mm, and a thickness of 1.2 mm, thereby producing a recording layer consisting of inorganic dielectric thin films and magneto-optical recording films stacked one upon the other on the substrate. Then, a doughnut-shaped film of polyethylene terephthalate, which had a thickness of 6 μm, an outer diameter of 86 mm, and an inner diameter of 28 mm, and one surface of which had an $\widehat{Rpm}$ of 0.4 μm, was adhered to the Al film of the recording layer by an adhesive in such a way that the other surface of this polyethylene terephthalate film and the Al film were opposed to each other, thereby forming a protective layer on the recording layer.

In this example, the reported center line average height of the polyethylene terephthalate film surface is the average of ten such measurements, taken at ten different locations on the protective layer's surface, which were selected at random. Each Rpm was measured over a traversing length of 4 mm, using an instrument for the measurement of surface roughness that employs the stylus method, which is standardized under JIS B0651 (Handysurf E30A, mfd. by Tokyo Precision K.K./cut off value=0.8 mm). To examine the friction between the protective layer of the magneto-optical disk thus obtained and a flying-type magnetic head in a relatively normal condition of 25° C. and 50%RH (Condition I), the coefficient of friction therebetween was measured in the following manner, under a condition in which the linear velocity of the disk with respect to the magnetic head was 6.60 m/s:

The disk was placed horizontally on a rotating spindle, and the flying-type magnetic head was set thereon in such a way that a fixed load (6 g) was applied to the protective layer of the disk. The disk was rotated in such a way that the linear velocity of the disk with respect to the magnetic head was adjusted to a predetermined value. The horizontal force applied to the flying-type, magnetic head in this condition was measured by means of a strain gage. The ratio of the value thus obtained to the fixed load was recorded as the coefficient of friction. Next, another magneto-optical recording medium was prepared in completely the same manner as described above, and the coefficient of friction between the protective layer of this magneto-optical recording medium and the flying-type magnetic head was measured in a high-temperature/humidity condition of 50° C. and 80%RH (Condition II). The measurement results are given in Table 1.

TABLE 1

| Linear velocity: | 6.60 m/s. |
|---|---|
| Coefficient of friction in Condition I: | 0.03 |
| Coefficient of friction in Condition II: | 0.04. |

Next, the adsorbing power between the protective layer of this magneto-optical recording medium and the magnetic head was measured with respect to Conditions I and II, respectively. The flying-type magnetic head was placed on the protective layer of the disk installed in the horizontal position, in such a way that a fixed load (6 g) was applied to the disk, and the force required for vertically lifting the magnetic head in this condition was recorded as the adsorbing power. The measurement results are given in Table 2.

TABLE 2

| Surface absorbing power | (g) |
|---|---|
| Condition I: | 6.1 |
| Condition II: | 6.5. |

(Examples 2-1~2-6)

As regards the six different examples of magneto-optical recording disks, two samples of each example, that is, twelve samples in total, were prepared (and their Rpm values measured) in completely the same way as in Example 1, except that the value of $\widehat{Rpm}$ of the film constituting the protective layer of the recording medium was varied as shown in Table 3. The coefficient of friction and the adsorbing power in Conditions I and II were measured with respect to each of these examples in the same manner as in Example 1.

TABLE 3

| Example | 2-1 | 2-2 | 2-3 | 2-4 | 2-5 | 2-6. |
|---|---|---|---|---|---|---|
| $\widehat{Rpm}$ (μm) | 0.1 | 0.2 | 0.5 | 0.65 | 0.75 | 0.85 |

(Comparative Examples 1-1~1-5)

As regards the five different comparative examples of magneto-optical recording disks, two samples of each example, that is, ten samples in total, were prepared in completely the same way as in Example 1, except that the value of $\widehat{Rpm}$ of the film constituting the protective layer of the recording medium was varied as shown in Table 4. The coefficient of friction and the adsorbing power in Conditions I and II were measured with respect to each of these comparative examples in the same manner as in Example 1.

TABLE 4

| Comp. Ex. | 1-1 | 1-2 | 1-3 | 1-4 | 1-5 |
|---|---|---|---|---|---|
| $\widehat{Rpm}$ (μm) | 0.02 | 0.05 | 0.9 | 1.0 | 1.2 |

Figure 3:
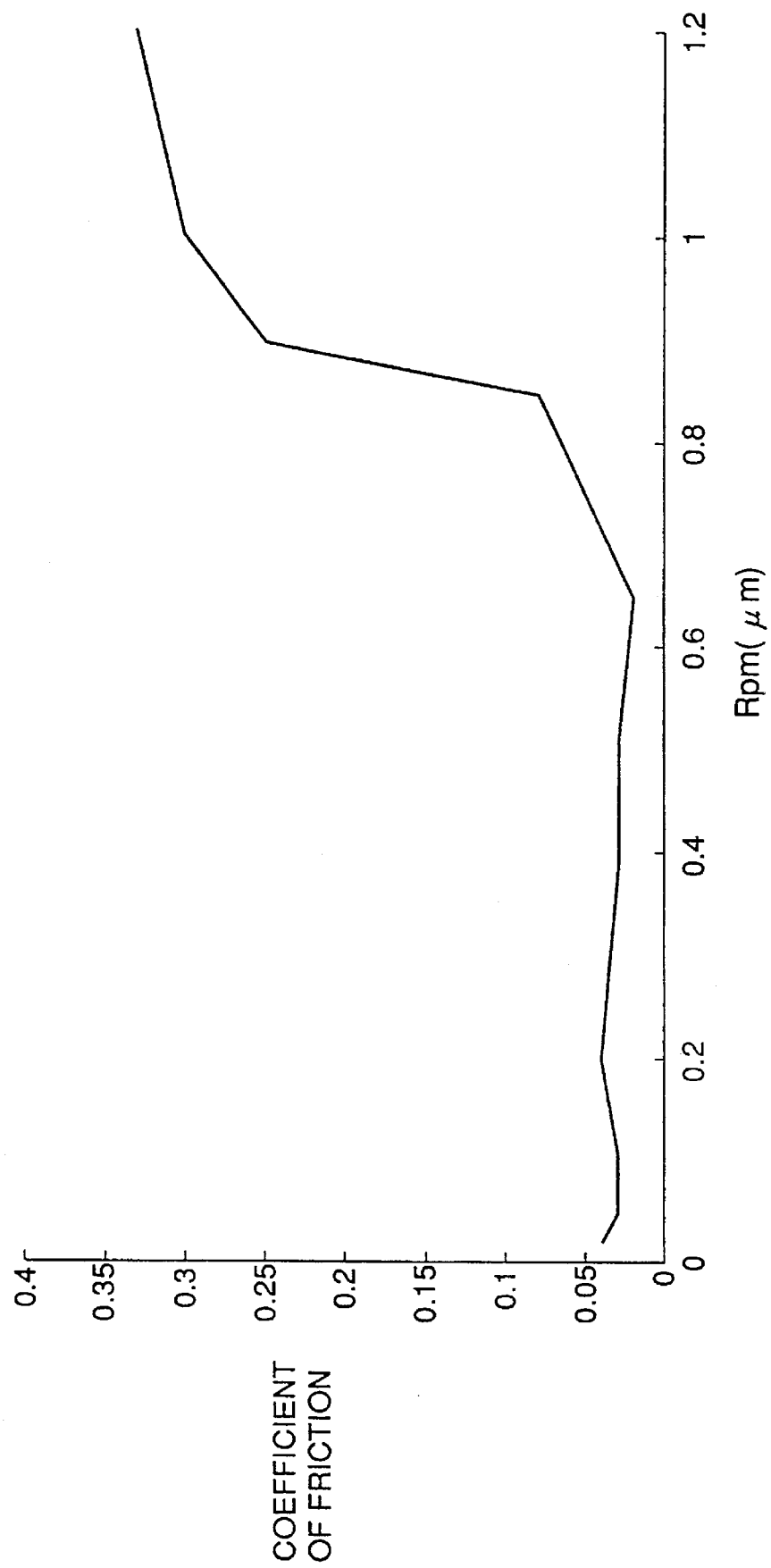
FIG. 3 is a chart showing the relationship between Rpm and coefficient of friction under Temperature/Humidity Condition I.
Figure 4:
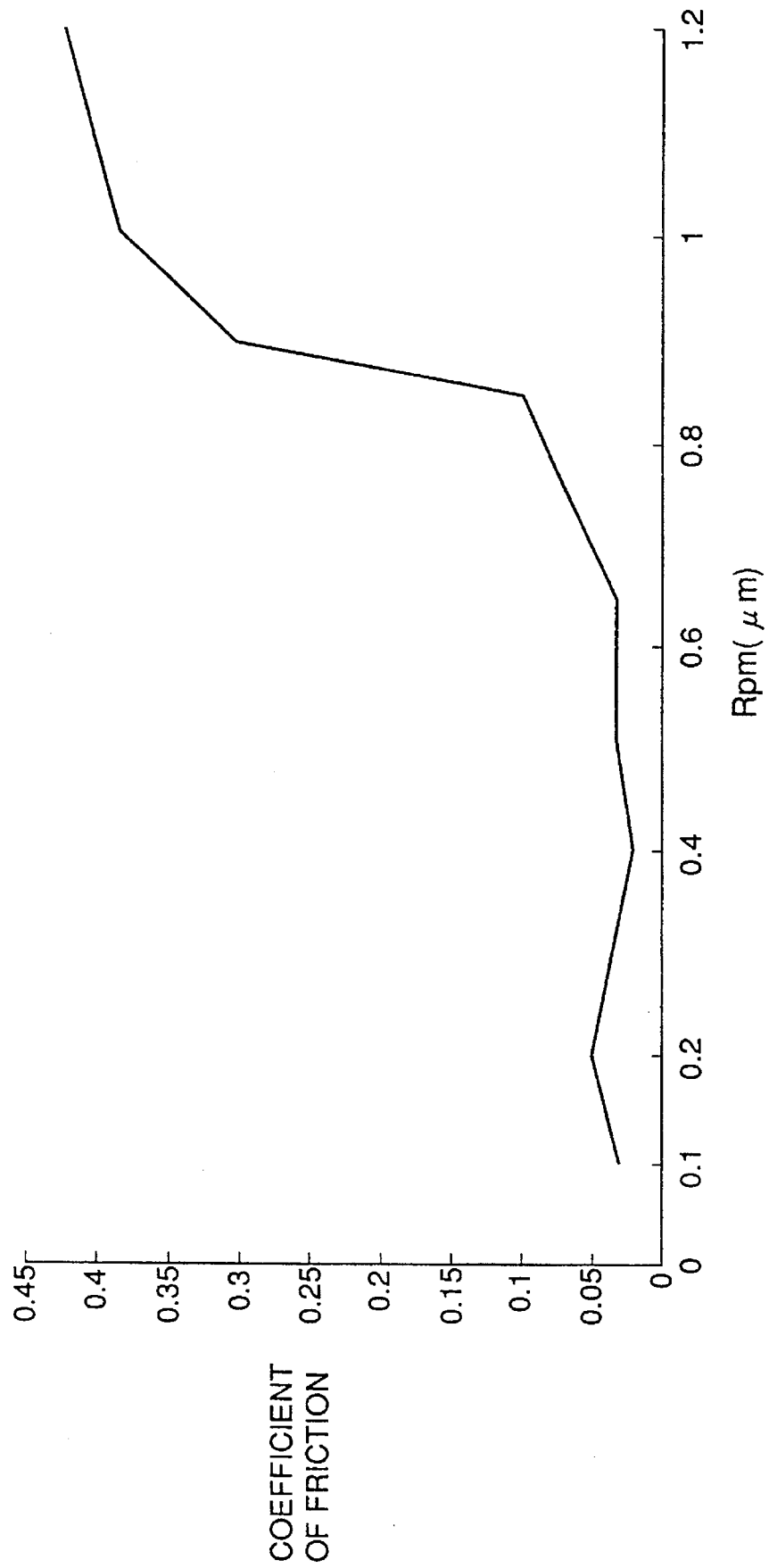
FIG. 4 is a chart showing the relationship between Rpm and coefficient of friction under Temperature/Humidity Condition II.

FIGS. 3 and 4 are graphs formed by plotting the results obtained in Example 1, Examples 2-1 through 2-6, and Comparative Examples 1-1 through 1-5 with respect to the coefficients of friction in Conditions I and II, respectively. The horizontal axis indicates Rpm and the vertical axis indicates the coefficient of friction.

Figure 5:
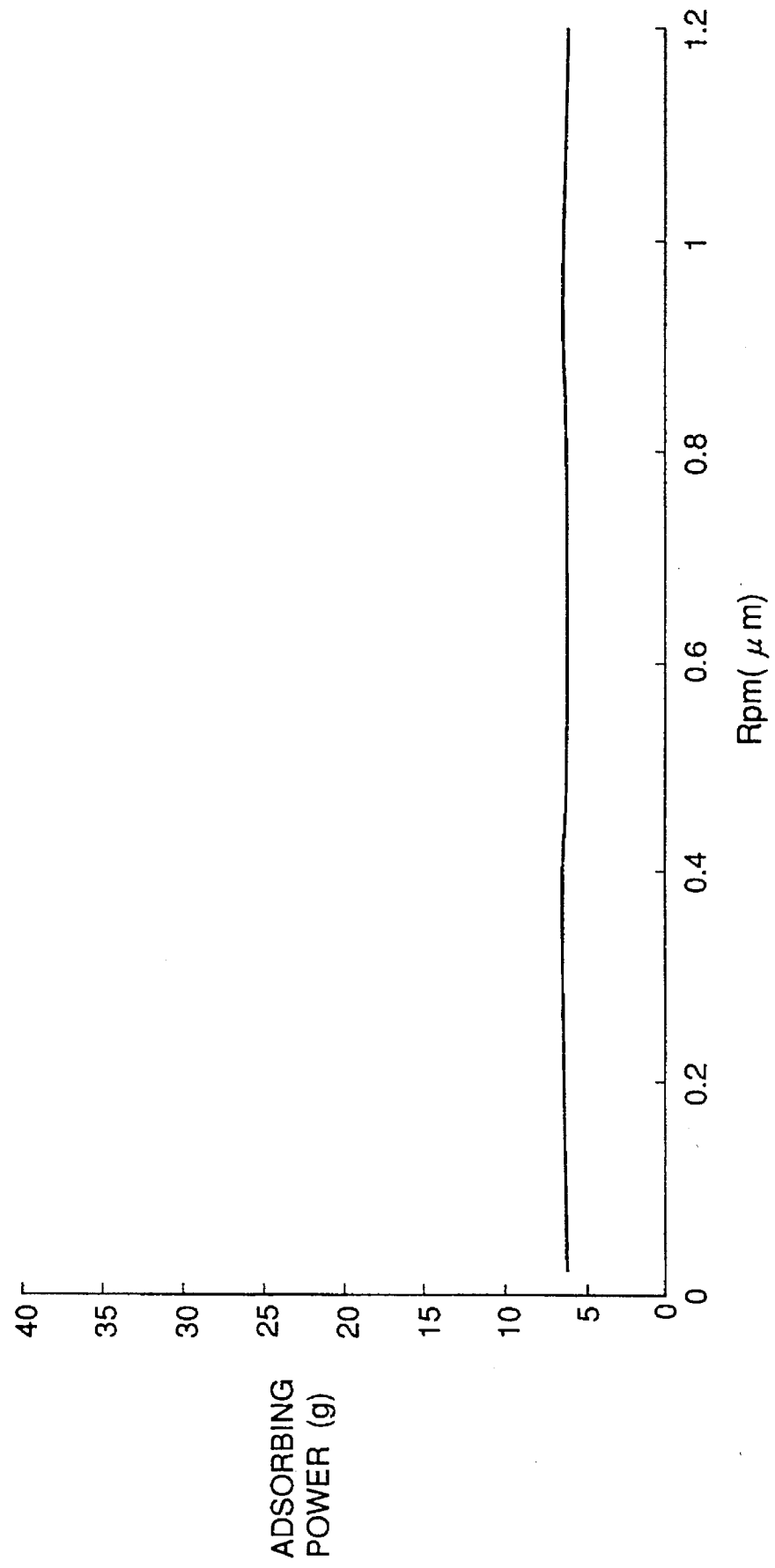
FIG. 5 is a chart showing the relationship between Rpm and adsorbing power under Condition I.
Figure 6:
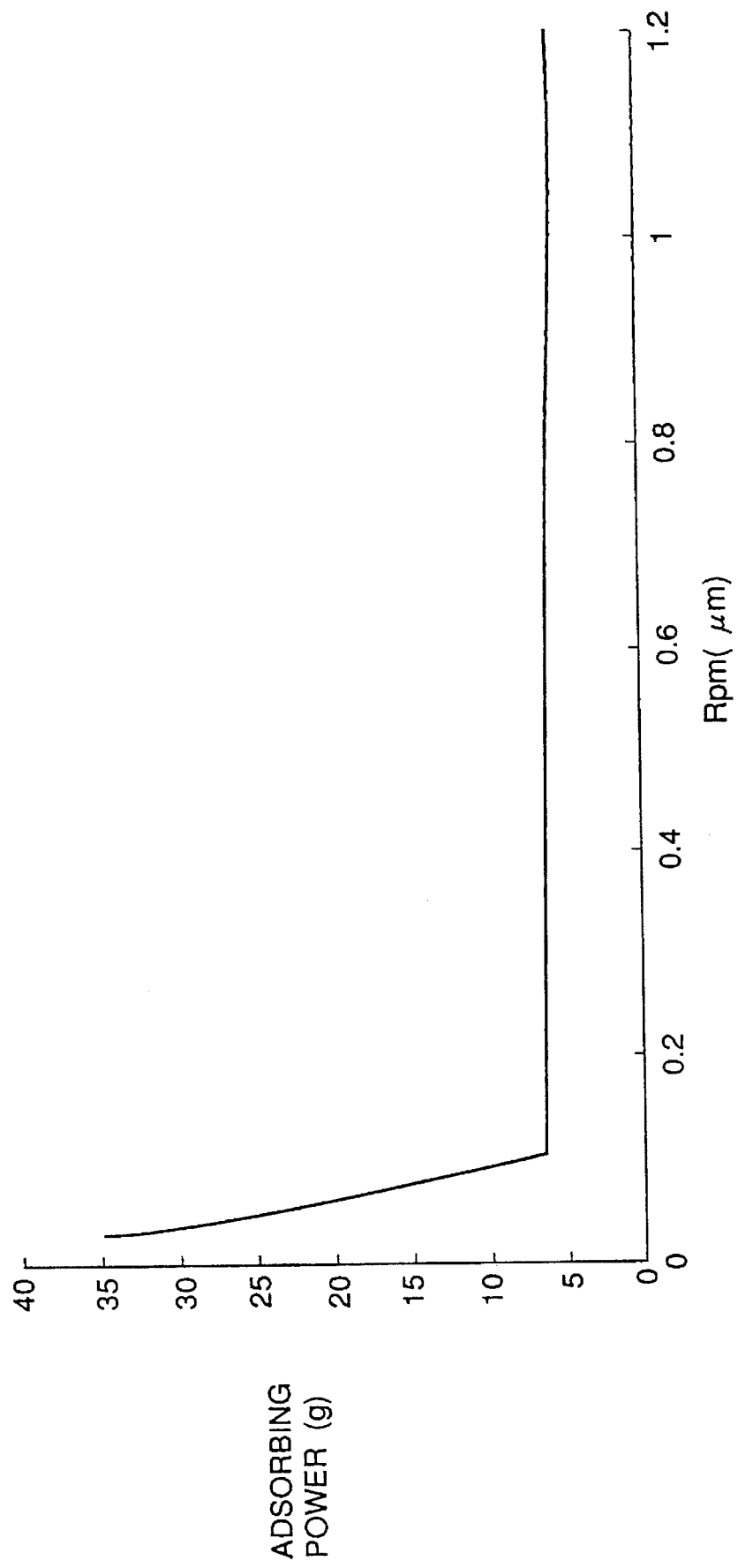
FIG. 6 is a chart showing the relationship between Rpm and adsorbing power under Condition II.

FIGS. 5 and 6 are graphs formed by plotting the results obtained in Example 1, Examples 2-1 through 2-6, and Comparative Examples 1-1 through 1-5 with respect to the adsorbing powers in Conditions I and II, respectively. The horizontal axis indicates Rpm and the vertical axis indicates adsorbing power.

It can be seen from FIG. 4 that the frictional force between the protective layer of the magneto-optical recording medium and the magnetic head in a high-temperature/humidity condition depends upon the Rpm. Further, as can be seen from FIGS. 3 and 4, in both the normal-temperature/humidity and high-temperature/humidity conditions, when the value of Rpm is not more than 0.85 μm, the coefficient of friction between the protective layer and the magnetic head is 0.1 or less, so that the magnetic head is in a stable flying condition.

Further, it can be seen from FIG. 5 that the adsorbing power between the protective layer of the magneto-optical recording medium and the magnetic head in a high-temperature/humidity condition depends upon the Rpm. Also, as can be seen from FIGS. 5 and 6, in both the normal-temperature/humidity and high-temperature/humidity conditions, when the value of Rpm is not less than 0.1 μm, the adsorbing power between the protective layer and the magnetic head is substantially equal to the load of the magnetic head applied to the protective layer, which means that the magnetic head has not been adsorbed onto the protective layer.

Besides, in the above comparative examples 1-1 and 1-2, the coefficient of friction between the protective layer and the magnetic head could not be measured because adsorption occurred between the protective layer and the magnetic head.

(Comparative Examples 2-1~2-5)

Magneto-optical disks were prepared in the same way as in Example 1, except that the value of $\widehat{Ra}$ (center line average roughness) of the film constituting the protective layer of the recording medium was varied as shown in Table 5. In each of these comparative examples, the value of Rpm was under 0.1 μm.

TABLE 5

| Comp. Ex. | 2-1 | 2-2 | 2-3 | 2-4 | 2-5. |
|---|---|---|---|---|---|
| $\widehat{Rpm}$ (μm) | 0.005 | 0.01 | 0.02 | 0.03 | 0.05 |

Figure 7:
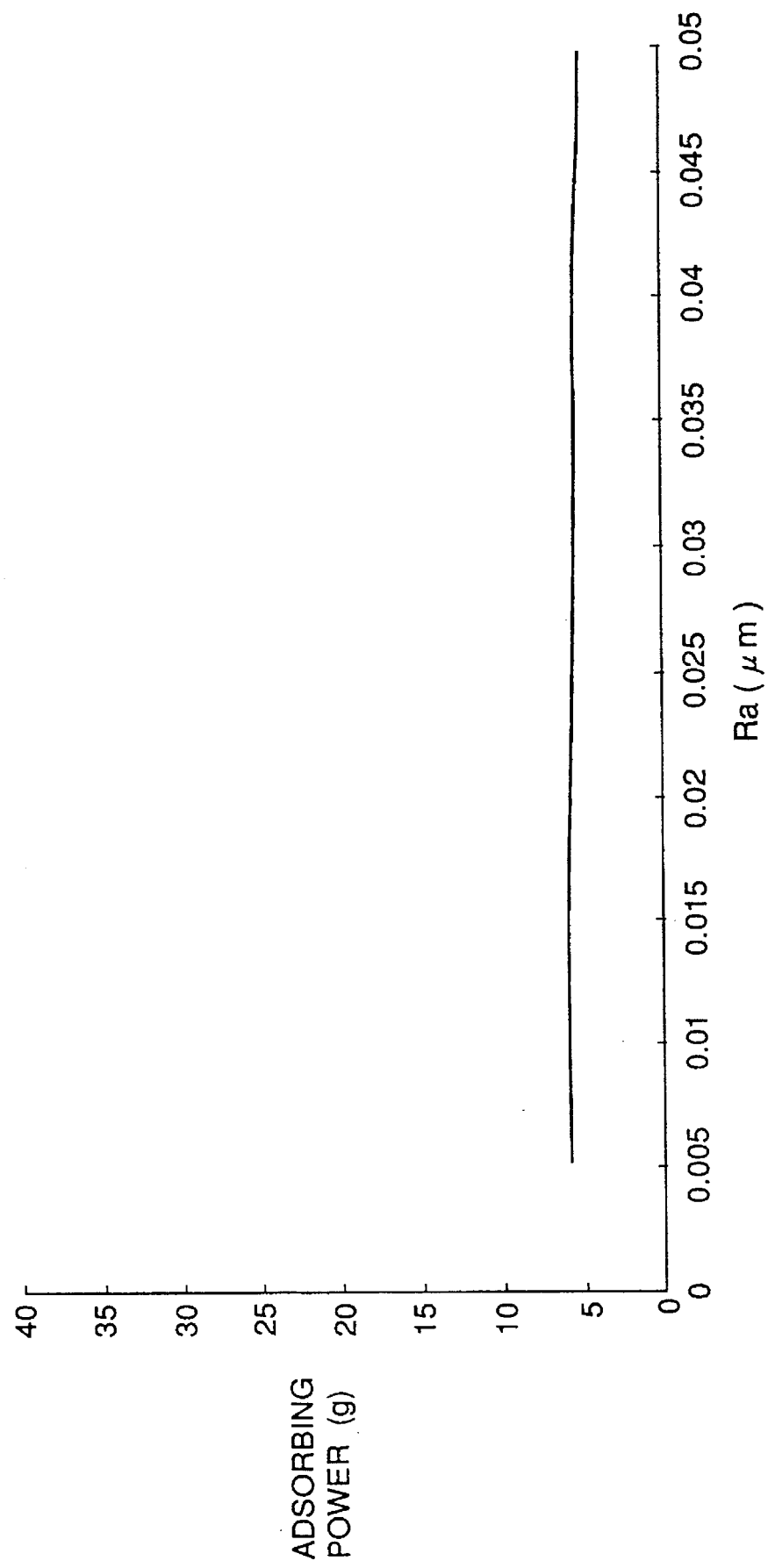
FIG. 7 is a chart showing the relationship between Ra and adsorbing power under Condition I.
Figure 8:
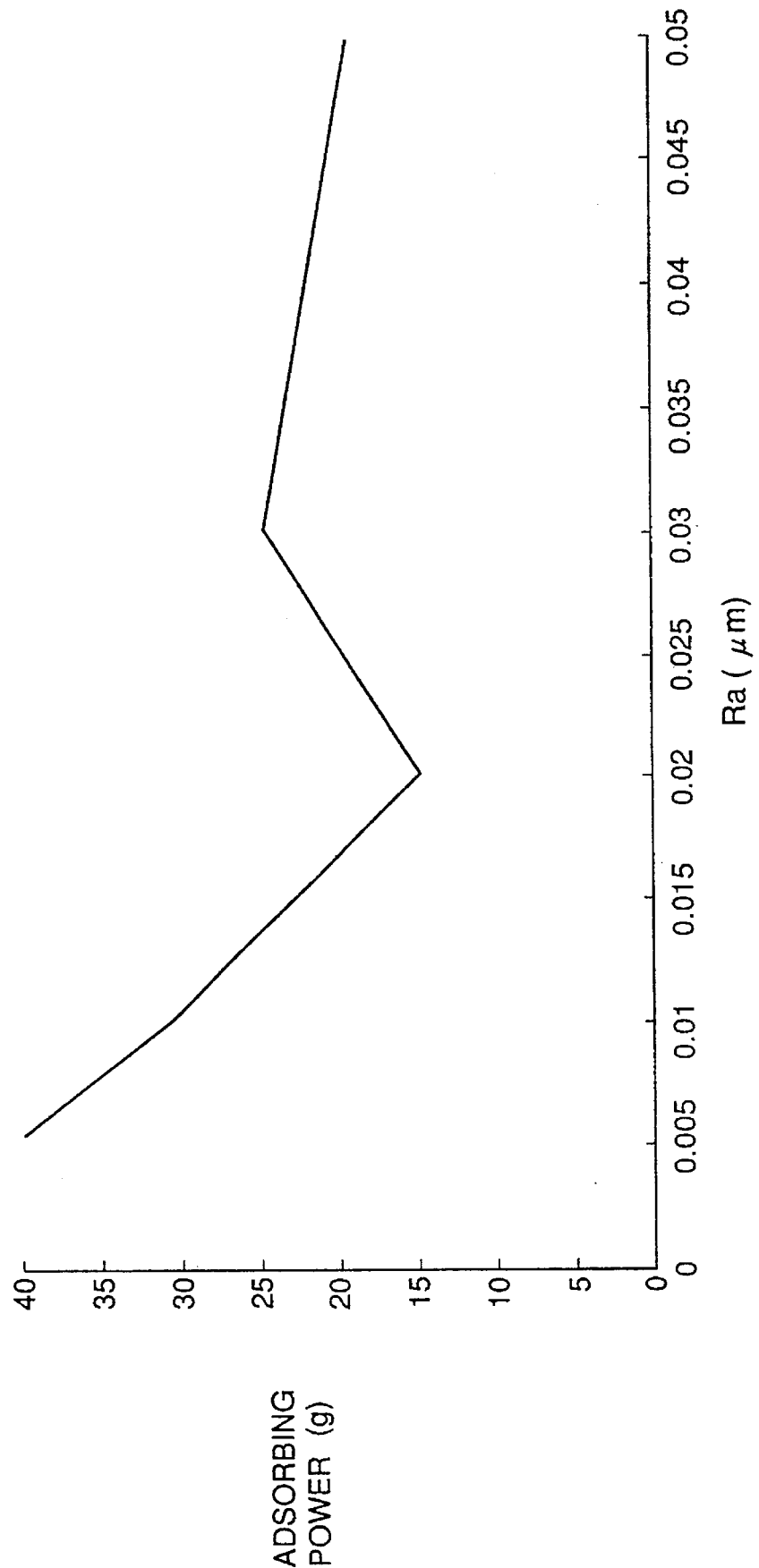
FIG. 8 is a chart showing the relationship between Ra and adsorbing power under Condition II.

The adsorbing power in each of Comparative Examples 2-1 through 2-5 with respect to Conditions I and II were measured in the same manner as in Example 1, and the values thus obtained with respect to the two conditions were plotted in the graphs of FIGS. 7 and 8, respectively, in which the horizontal axis indicates the value of Ra and the vertical axis indicates the adsorbing power. As can be seen from FIGS. 7 and 8, in a normal-temperature/humidity condition, Ra indicated the correlation between the protective film and the magnetic head, whereas, in a high-temperature/humidity condition, no correlation was observed between them. In these comparative examples, the $\widehat{Ra}$ is an average of Ra measured at ten points of the protective layer's surface, which were selected at random, and each Ra was measured by using an instrument for the measurement of surface roughness by the stylus method, which is standardized under JIS B0651 (Handysurf E30A, mfd. by Tokyo Precision K.K./cut off value=0.8 mm).

(Examples 3~7)

As regards the five different examples of magneto-optical disks, two samples of each example, respectively having $\widehat{Rpm}$ values of 0.1 μm, 0.4 μm, 0.65 μm, 0.75 μm and 0.85 μm, were prepared in completely the same manner as in Example 1.

The coefficients of friction of these magneto-optical disks in Conditions I and II were measured, under a condition in which the linear velocity of the magnetic head with respect to the disk was varied as follows: 3.67 m/s, 4.40 m/s, and 5.50 m/s.

The method of measurement was completely the same as that used in Example 1.

The measurement results are given in Table 6.

The evaluation of the examples was made based on the following standards:

AA: coefficient of friction was 0.05 or less

A: coefficient of friction was more than 0.05 but not more than 0.1

B: coefficient of friction was more than 0.1 but not more than 0.2

C: coefficient of friction was more than 0.2

TABLE 6

| | | Coefficient of friction | | | |
|---|---|---|---|---|---|
| | $\widehat{Rpm}$ (μm) | Linear velocity (m/s) | 3.67 | 4.40 | 5.50 |
| Example 3 | 0.1 | Condition I | AA | AA | AA |
| | | Condition II | AA | AA | AA |
| Example 4 | 0,4 | Condition I | AA | AA | AA |
| | | Condition II | AA | AA | AA |
| Example 5 | 0.65 | Condition I | AA | AA | AA |
| | | Condition II | AA | AA | AA |
| Example 6 | 0.75 | Condition I | AA | AA | AA |
| | | Condition II | AA | AA | AA |
| Example 7 | 0.85 | Condition I | AA | AA | AA |
| | | Condition II | B | A | AA. |

Next, the adsorbing power between the protective layer and the magnetic head in each of Examples 3 through 7 was measured in the same manner as in Example 1, with respect to a condition of 60° C. and 80%RH (Condition III) and a condition of 70° C. and 80%RH (Condition IV).

Table 7 shows the evaluation results obtained.

The evaluation of Table 7 was made based on the following standards:

A: adsorbing power was 7.0 g or less

B: adsorbing power was more than 7.0 g

TABLE 7

| | | Absorbing power | |
|---|---|---|---|
| | $\widehat{Rpm}$ (μm) | Condition III | Condition IV |
| Example 3 | 0.10 | B | B |
| Example 4 | 0.40 | A | B |
| Example 5 | 0.65 | A | A |
| Example 6 | 0.75 | A | A |
| Example 7 | 0.85 | A | A. |

Although the present invention has been described with respect to several specific embodiments and applications, it is not limited thereto. Numerous variations and modifications readily will be appreciated by those skilled in the art and are intended to be included within the scope of the present invention, which is recited in the following claims.

What is claimed is:

1. A magneto-optical recording medium comprising a substrate, a recording layer including a magneto-optical recording film, and a protective layer, arranged in that order, wherein a surface of said protective layer which is not opposed to said recording layer has a surface roughness Rpm in the range of 0.1 μm to 0.85 μm, wherein Rpm= (⅕)(P1+P2+P3+P4+P5), where $P_n$ represents a distance between a center line and a straight line that is parallel to the center line and passes the highest crest of a surface portion roughness curve f(x) in each of 5 portions of the surface roughness curve of the protective layer sampled along a line X over a traversing length L.

2. A magneto-optical recording medium according to claim 1, wherein the surface of said protective layer which is not opposed to said recording layer has a surface roughness Rpm in the range of 0.1 μm to 0.8 μm.

3. A magneto-optical recording medium according to claim 2, wherein the surface of said protective layer which is not opposed to said recording layer has a surface roughness Rpm in the range of 0.15 μm to 0.75 μm.

4. A magneto-optical recording medium according to claim 1, wherein Rpm is calculated with respect to a traversing length L of from about 2 mm to 6 mm.

5. A magneto-optical recording medium according to claim 1, wherein said recording layer further includes a first inorganic dielectric film arranged between the substrate and the magneto-optical recording film, a second inorganic dielectric film arranged between the magneto-optical recording film and the protective layer, and a reflecting film arranged between the second inorganic dielectric film and the protective layer.

6. A magneto-optical recording medium according to claim 1, wherein said magneto-optical recording film comprises a rare earth-transition metal amorphous magnetic alloy.

\* \* \* \* \*

UNITED STATES PATENT AND TRADEMARK OFFICE
CERTIFICATE OF CORRECTION

PATENT NO. : 5,576,087
DATED : November 19, 1996
INVENTOR(S) : YUKIO WATANABE, ET AL.

It is certified that error appears in the above-indentified patent and that said Letters Patent is hereby corrected as shown below:

TITLE PAGE:

At [56] References Cited

```
"4064936   2/1991   Japan
 3066079   3/1991   Japan"  should read

--4-064936  2/1991   Japan
  3-66079   3/1991   Japan--.

"4184730   7/1992   Japan
 4195746   7/1992   Japan
 4195748   7/1992   Japan"  should read --4-184730  7/1992   Japan
  4-195746  7/1992   Japan
  4-195748  7/1992   Japan--.
```

Column 6

Line 19, "Rpmof" should read --Rpm of--.

Signed and Sealed this

Eighteenth Day of March, 1997

Attest:

BRUCE LEHMAN

*Attesting Officer*   Commissioner of Patents and Trademarks